United States Patent
Cooper

(10) Patent No.: US 10,058,026 B1
(45) Date of Patent: Aug. 28, 2018

(54) UNDERGROUND FERTILIZING SYSTEM FOR IRRIGATION SYSTEM

(71) Applicant: Danny Cooper, Fort Worth, TX (US)

(72) Inventor: Danny Cooper, Fort Worth, TX (US)

( * ) Notice: Subject to any disclaimer, the term of this patent is extended or adjusted under 35 U.S.C. 154(b) by 0 days.

(21) Appl. No.: 15/271,335

(22) Filed: Sep. 21, 2016

(51) Int. Cl.
| A01C 23/04 | (2006.01) |
| A01G 25/02 | (2006.01) |
| A01G 25/16 | (2006.01) |
| A01G 25/00 | (2006.01) |
| A01M 21/04 | (2006.01) |
| A01M 17/00 | (2006.01) |
| A01M 7/00 | (2006.01) |
| G09F 17/00 | (2006.01) |

(52) U.S. Cl.
CPC .......... *A01C 23/042* (2013.01); *A01C 23/047* (2013.01); *A01G 25/00* (2013.01); *A01G 25/023* (2013.01); *A01G 25/16* (2013.01); *A01M 7/006* (2013.01); *A01M 17/00* (2013.01); *A01M 21/043* (2013.01); *G09F 17/00* (2013.01); *G09F 2017/0083* (2013.01)

(58) Field of Classification Search
CPC .... A01C 23/042; A01C 23/047; A01G 25/00; A01G 25/16; A01G 25/023; A01M 7/006; A01M 17/00; A01M 21/043; G09F 17/00; G09F 2017/0083
USPC ...... 239/200, 201, 207, 310; 405/36, 39, 40, 405/47, 128.45, 128.5, 128.7, 128.75
See application file for complete search history.

(56) References Cited

U.S. PATENT DOCUMENTS

| 3,669,357 | A | | 6/1972 | Overbey | |
| 3,797,740 | A | * | 3/1974 | Kah, Jr. | A01G 25/16 137/119.08 |
| 4,852,802 | A | | 8/1989 | Iggulden et al. | |
| 4,870,991 | A | | 10/1989 | McMillan et al. | |
| 4,971,248 | A | | 11/1990 | Marino | |
| 5,022,585 | A | | 6/1991 | Burgess | |
| 5,092,556 | A | * | 3/1992 | Darling | A01G 25/00 116/173 |
| 5,234,286 | A | * | 8/1993 | Wagner | B65D 88/76 137/357 |
| 5,303,729 | A | | 4/1994 | DeMarco | |
| 5,366,159 | A | | 11/1994 | Childers | |
| 5,730,364 | A | | 3/1998 | Gertie | |
| 5,772,115 | A | | 6/1998 | Vaughn | |
| 5,775,593 | A | | 7/1998 | Delorme et al. | |
| 5,778,608 | A | * | 7/1998 | Elliott, Jr. | B65D 88/76 220/565 |
| 5,836,518 | A | | 11/1998 | Jester | |
| 5,908,157 | A | | 6/1999 | Antonellis et al. | |
| 7,638,064 | B1 | * | 12/2009 | Miller | A01G 25/00 210/739 |

(Continued)

FOREIGN PATENT DOCUMENTS

JP 2000350549 * 12/2000

*Primary Examiner* — Carib A Oquendo
(74) *Attorney, Agent, or Firm* — James E. Walton

(57) ABSTRACT

A system and method for applying liquid based fertilizers and pesticides stored underground through an irrigation system includes a first irrigation system, a second irrigation system, and a storage tank partially located underground, the storage tank being in fluid connection with the second irrigation system, wherein the storage tank is configured for storing and supplying liquid fertilizer to the second irrigation system.

15 Claims, 3 Drawing Sheets

(56) References Cited

U.S. PATENT DOCUMENTS

| | | | | |
|---|---|---|---|---|
| 8,191,307 | B2* | 6/2012 | Donoghue | A01G 25/16 47/48.5 |
| 8,297,535 | B1 | 10/2012 | Reid | |
| 8,342,427 | B1 | 1/2013 | Jivanjee, Jr. | |
| 2004/0049978 | A1* | 3/2004 | Lips, II | A01C 23/042 47/48.5 |
| 2006/0027676 | A1* | 2/2006 | Buck | A01C 23/042 239/63 |
| 2007/0290072 | A1* | 12/2007 | Smith | B05B 7/32 239/310 |
| 2009/0060659 | A1* | 3/2009 | Wallace | A01G 25/00 405/43 |
| 2010/0222932 | A1* | 9/2010 | O'Connor | A01G 25/16 700/284 |
| 2014/0346099 | A1* | 11/2014 | Brantley | A01G 25/00 210/127 |

* cited by examiner

UNDERGROUND FERTILIZING SYSTEM FOR IRRIGATION SYSTEM

BACKGROUND

1. Field of the Invention

The present invention relates in general to the field of fertilizer systems, and more specifically to a system for the storage of liquid fertilizer and pesticides in ground and the utilization of an in ground spraying system for the application of said liquid fertilizer and pesticides.

2. Description of Related Art

Lawns, pastures, home sites, and such require the application of fertilizer to improve the quality of the grasses and plants located in the lawn. Conventionally fertilizes are granular and are spread with drop or broadcast spreaders to cover the desired area. Additionally there are conventional systems for spreading liquid fertilizers that require a user spray the liquid fertilizer in the desired areas. All of these conventional systems have the requirement that the user apply the fertilizer directly, for example by pushing the spreader or walking and spraying at the same time. The application of fertilizer directly to the desired areas requires considerable time to distribute the fertilizer. Additionally, the user is needlessly exposed to the dangerous fertilizer by being in close proximity to the fertilizer while being distributed. While there are many ways to apply fertilizer known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
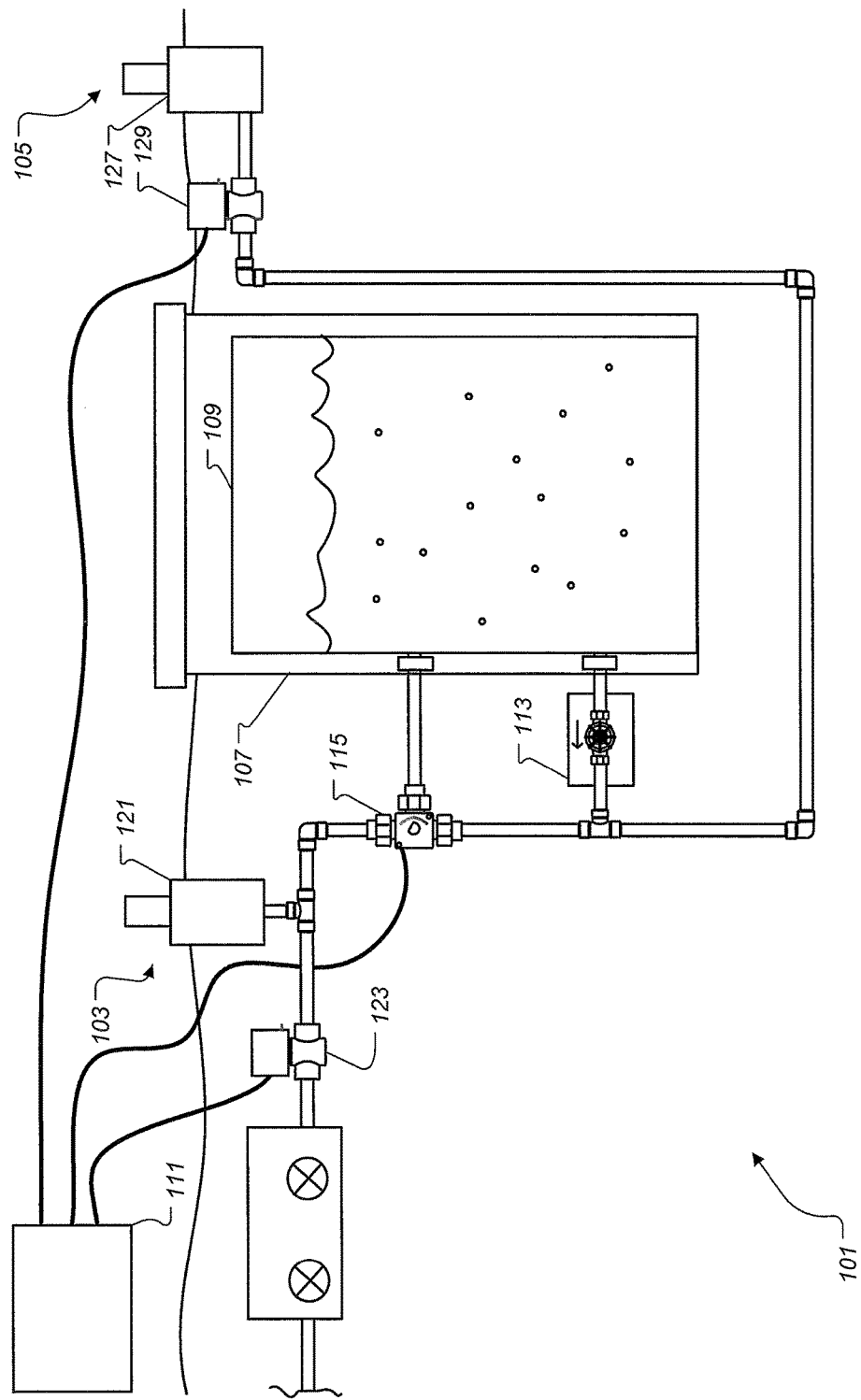
FIG. 1 is a plan view of an underground fertilizing system for irrigation systems according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of underground fertilizing systems for irrigation systems are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a preferred embodiment of underground fertilizing system for irrigation system according to the present application is illustrated. Underground system 101 is comprised of a first irrigation system 103, a second irrigation system 105, a tank holder 107, a tank 109, a controller 111, a one-way check valve 113, a three way valve 115, and various pipes and fittings to couple the various elements together to allow fluid to transfer from the water supply and the tank through the system and out the first and second irrigation systems. While conventional pipes and fittings can be utilized for both the first and second irrigation system, identifiable pipes are preferred for those locations capable of transporting fertilizer. For example, the fertilizer plumbing can be colored green instead of white to indicate the contents of the pipe.

First irrigation system 103 is comprised of a sprinkler head 121 and a valve 123. Second irrigation system 105 is comprised of a sprinkler head 127 and a valve 129. First irrigation system 103 is configured for supplying water to an agricultural area. Second irrigation system 105 is configured for supplying water and/or liquid fertilizer to an agricultural area located adjacent the irrigation system. While the preferred underground system is installed initially. Elements of the system as needed can be added to an existing irrigation system to provide the ability to water and distribute liquid fertilizer.

The system 101 operates by the controller controlling valves for allowing water to flow through the system. For example, the three way valve 115 controls water flow into the tank 109 and thereby water flow out of the tank through the one way valve 113. Water out of the tank now includes fertilizer for distribution though the second irrigation system. The controller can operate three way valve 115 to stop the flow of water into the tank 109 and flush any remaining fertilizer from the second irrigation system 105. Tank 109 contains premixed liquid fertilizer configured to be sprayed from the second irrigation system. Tank 109 is removable and replaceable with another tank containing premixed liquid fertilizer. Alternatively the tank 109 contains concentrated liquid fertilizer configured to be mixed with water and then sprayed from the second irrigation system.

Controller 111 is preferably a microprocessor based system for allowing a user to regulate water flow through the system onto the lawn. User can control the various zones and the amount of water and fertilizer each zone receives by the controller. Furthermore, in retrofit systems the controller 111 can be wired into existing sprinkler controllers as another zone.

Figure 2:
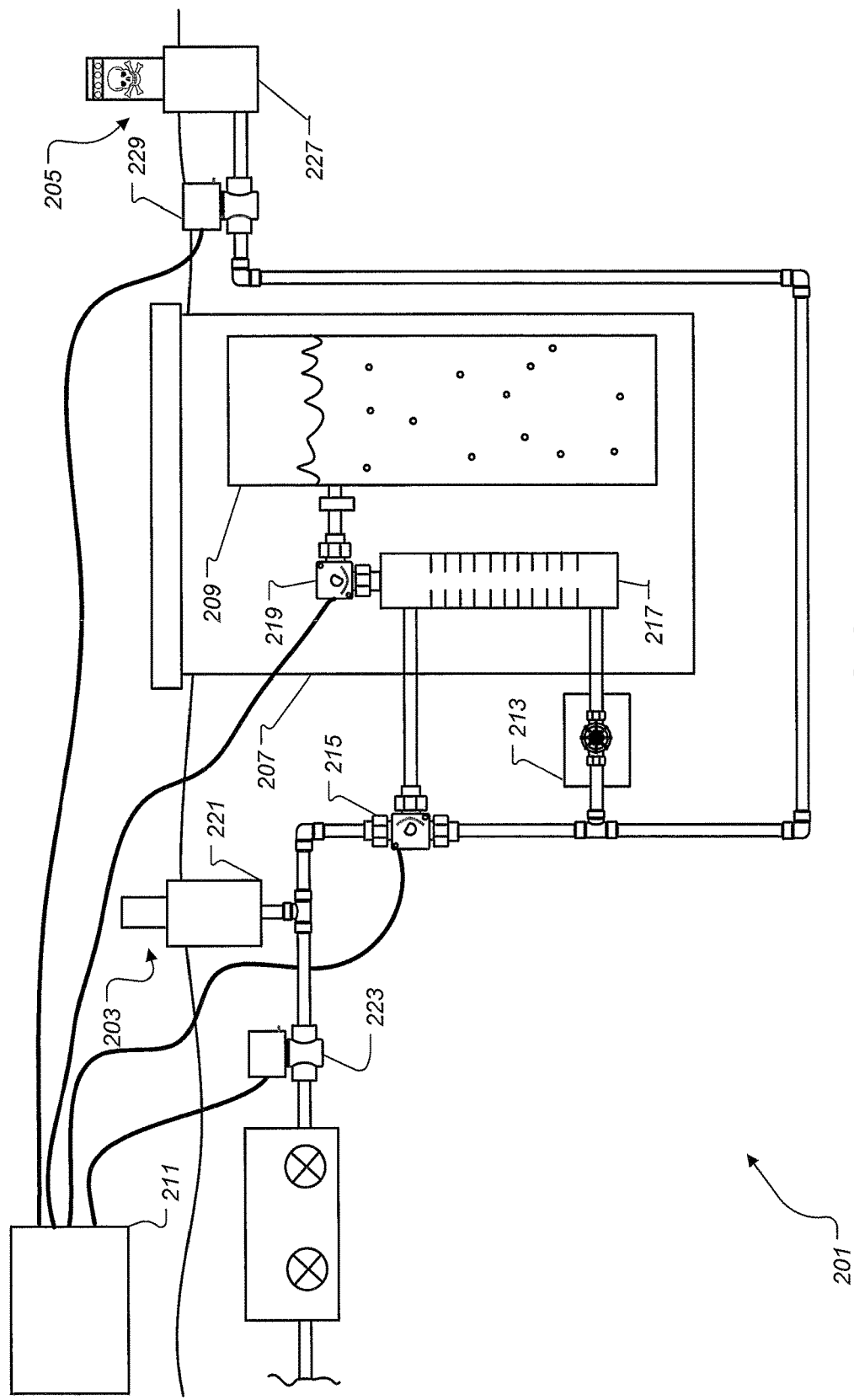
FIG. 2 is a plan view of an alternative underground fertilizing system for irrigation systems according to the present application.
Figure 3:
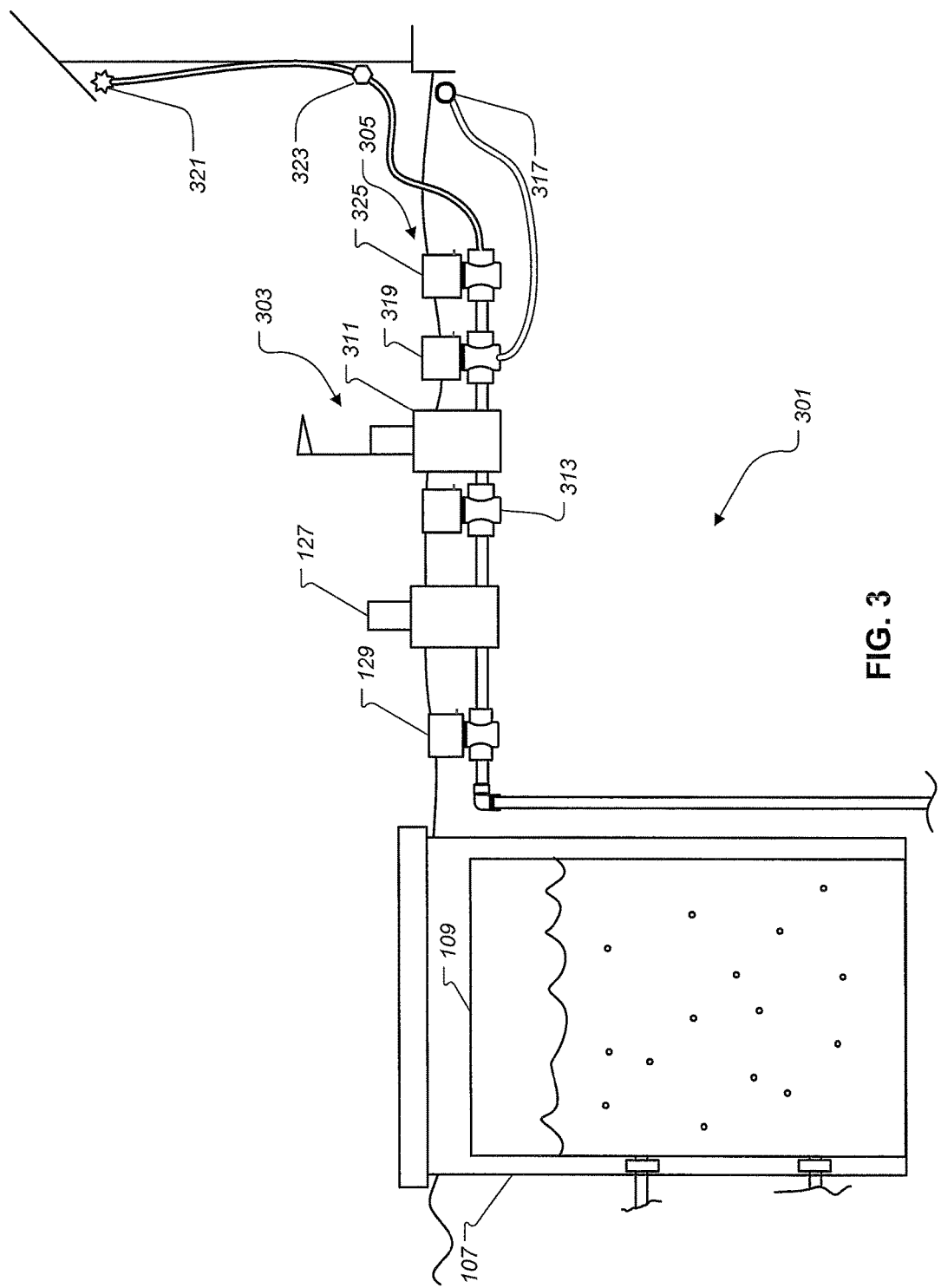
FIG. 3 is a plan view of an alternative underground fertilizing system for irrigation systems according to the present application.

Referring now also to FIG. 2 in the drawings, an alternative embodiment of underground fertilizing system for irrigation system according to the present application is illustrated. Underground system 201 is comprised of a first irrigation system 203, a second irrigation system 205, a tank holder 207, a tank 209, a controller 211, a one-way check valve 213, a three way valve 215, a mixer 217, a metering valve 219, and various pipes and fittings to couple the various elements together to allow fluid to transfer from the water supply and the tank through the system and out the first and second irrigation systems. While conventional pipes and fittings can be utilized for both the first and second irrigation system, identifiable pipes are preferred for those locations capable of transporting fertilizer. For example, the fertilizer plumbing can be colored green and labeled "poison" instead of white to indicate the contents of the pipe.

First irrigation system 203 is comprised of a conventional sprinkler head 221 and a sprinkler valve 223. Second irrigation system 205 is comprised of an improved sprinkler head 227 and an improved valve 229. Improved sprinkler head 227 is configured for distributing liquid fertilizer by having a large size to prevent clogging due to the additional fertilizer and is clearly identifiable as dangerous. For example, improved sprinkler head comprises readily identifiable warnings to those near through the use of a dangerous symbol and or using light emitting diodes to alert users to stay away while spraying. Light emitting diodes can be commanded to only activate upon the spraying of fertilizer through the second irrigation system. First irrigation system 203 is configured for supplying water to an agricultural area. Second irrigation system 205 is configured for supplying water and/or liquid fertilizer to an agricultural area located adjacent the irrigation system. While the preferred underground system is installed initially. Elements of the system as needed can be added to an existing irrigation system to provide the ability to water and distribute liquid fertilizer. Many different types of nozzles and sprinkler heads are contemplated to be utilized with this system to spread water and or fertilizer. For example, drip heads can be utilized to precisely apply fertilizer.

The system 201 operates by the controller controlling valves for allowing water to flow through the system. For example, the three way valve 215 controls water flow into the tank 209 and thereby water flow out of the tank through the one way valve 213. Water out of the tank now includes fertilizer for distribution though the second irrigation system. The controller can operate the three way valve 215 to stop the flow of water into the tank 209 and flush any remaining fertilizer from the second irrigation system 205. Tank 209 contains premixed liquid fertilizer configured to be sprayed from the second irrigation system. Tank 209 is removable and replaceable with another tank containing premixed liquid fertilizer. Alternatively the tank 209 contains concentrated liquid fertilizer configured to be mixed with water in mixer 217 and then sprayed from the second irrigation system 205.

Referring now also to FIG. 3 in the drawings, an alternative embodiment of underground fertilizing system for irrigation system according to the present application is illustrated. System 301 is comprised the same as system 101. System 301 is further comprised of a third irrigation system 303, a fourth irrigation system 305, and a fifth irrigation system 307.

Third irrigation system 303 is comprised of an improved sprinkler head 311 and an improved valve 313. Improved sprinkler head 311 is configured for distributing liquid fertilizer by being clearly identifiable as dangerous with a flag or marker that rises concurrent with the head 311. For example, improved sprinkler head comprises readily identifiable warnings to those near through the use of a dangerous symbol to alert users to stay away while spraying as shown in FIG. 3 the flag is raised over the lawn or surface of the ground to alert users.

Fourth irrigation system 305 is comprised of an improved drip head 317 and an improved valve 319. Improved drip head 317 is configured for distributing liquid insecticide underground for subterranean insect extermination. For example, termite poison can be distributed through the system into the ground near a building or dwelling regularly and easily.

Fifth irrigation system 307 is comprised of an improved misting head 321, an improved drip head 323, and an improved valve 325. Improved misting head 321 is configured for distributing liquid insecticide in the air. For example, mosquito repellant can be distributed through the system into the air near a building or dwelling regularly and easily. Improved dripping head 323 is configured for distributing liquid on a wall. For example, spider insecticide can be distributed through the system onto the walls of a building or dwelling regularly and easily to prevent spiders from nesting.

The system of the present application is an all-in-one irrigation system that illuminates the hard labor of using the push spreaders on commercial and residential properties.

The system lines are 6 inches beside the regular irrigation system. The system has the same amount of irrigation lines as the regular system but the fertilizing tanks and lines are underground. This system is attached to the regular irrigation sprinkler system. These tanks are replaceable and can be flushed out to keep the lines from stopping up. This system will be all inclusive with the sprinkler system and the fertilizing system in one and controlled by a computer so that they are run simultaneously distributing the precise amount of fertilizer and water.

The pesticide application of the system contains the same tanks, but instead of fertilizer, there will be termiticide placed in the tanks. With the tanks at a tenth filled with the termiticide water from the irrigation system flows through the tanks around the exterior building or home. Specialized lines will be placed around the building or home exterior. These lines have holes positioned on the north, south, east and west of each line to ensure that the proper amount of termiticide is distributed throughout the soil area around building exterior and home exterior for the termite treatment.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A fertilizer system, comprising:

a first irrigation system for supplying water to an agricultural area, the first irrigation system comprising:
- a first valve;
- a first sprinkler head; and
- a first set of pipes for placing the first valve into fluid communication with the first sprinkler head;

a second irrigation system for supplying liquid fertilizer to the agricultural area, the second irrigation system comprising:
- a second valve;
- a second sprinkler head; and a second set of pipes for placing the second valve into fluid communication with the second sprinkler head; and a storage tank partially located underground, the storage tank being in fluid connection with the second irrigation system via a one-way valve;

wherein the storage tank is configured for storing and supplying liquid fertilizer to the second irrigation system;

and wherein the second set of pipes from the second irrigation system are isolated from the first set of pipes from the first irrigation system via a three-way valve, such that fluid in the second set of pipes of the second irrigation system cannot mix with fluid in the first set of pipes of the first irrigation system.

2. The fertilizer system according to claim 1, wherein the one way valve is located between the storage tank and the second irrigation system.

3. The fertilizer system according to claim 1, wherein the storage tank is located inside an underground holding tank; and wherein the storage tank is readily removable.

4. The fertilizer system according to claim 3, further comprising:
a mixer disposed within the underground holding tank for mixing the liquid fertilizer with water.

5. The fertilizer system according to claim 1, wherein the second valve is located between the storage tank and the second sprinkler head.

6. The fertilizer system according to claim 1, the second sprinkler head comprising:
a warning flag that pops up and retracts with the second sprinkler head, the warning flag being operable between a retracted position in which the warning flag is below the surface of the ground and a raised position in which the warning flag is above the ground.

7. The fertilizer system according to claim 1, wherein the second sprinkler head is enlarged to prevent clogging by the fertilizer.

8. The fertilizer system according to claim 1, further comprising:
at least one light emitting diode operably associated with the second sprinkler head to indicate operation of the second irrigation system.

9. The fertilizer system according to claim 1, wherein the three-way valve is configured to isolate the storage tank and allow the liquid fertilizer to be flushed from the second irrigation system with the water.

10. An irrigation system, comprising:
a first irrigation system for supplying water to a first area, the first irrigation system comprising:
a first valve;
a first sprinkler head; and
a first set of pipes for placing the first valve into fluid communication with the first sprinkler head;
a second irrigation system for supplying insecticide to a second area, the second irrigation system comprising:
a second valve;
a second sprinkler head; and
a second set of pipes for placing the second valve into fluid communication with the second sprinkler head; and
a storage tank partially located underground, the storage tank being in fluid connection with the second irrigation system via a one-way valve;
wherein the storage tank is configured for storing and supplying the insecticide to the second irrigation system;
and wherein the second set of pipes from the second irrigation system are isolated from the first set of pipes from the first irrigation system via a three-way valve, such that fluid in the second set of pipes of the second irrigation system cannot mix with fluid in the first set of pipes of the first irrigation system.

11. The irrigation system according to claim 10, wherein the second irrigation system comprises:
at least one subterranean drip head for distributing the insecticide underground.

12. The irrigation system according to claim 10, wherein the second irrigation system comprises:
at least one misting head for distributing the insecticide into the air.

13. The irrigation system according to claim 10, further comprising:
an underground holding tank for storing the storage tank, such that the storage tank is readily removable.

14. The irrigation system according to claim 13, further comprising:
a mixer disposed within the underground holding tank for mixing the insecticide with water.

15. The irrigation system according to claim 10, further comprising:
a third irrigation system for supplying liquid fertilizer to the first area, the third irrigation system having a third set of pipes, a third sprinkler head, and a third valve, separated from the first irrigation system and the second irrigation system by a second three-way valve.

* * * * *